US012652276B2

(12) United States Patent
Huang et al.

(10) Patent No.: US 12,652,276 B2
(45) Date of Patent: Jun. 9, 2026

(54) UNIFIED MULTI-ACCOUNT BASED INFORMATION MANAGEMENT

(71) Applicant: Stripe, LLC, South San Francisco, CA (US)

(72) Inventors: Ji Huang, Bothell, WA (US); Angelica Schwartz, San Francisco, CA (US); Stefan Gawrys, Seattle, WA (US); Alexander Thiemann, San Francisco, CA (US); Si Wang, Davis, CA (US); Hongshan Zhou, New York, NY (US); Justin Ahn, Seattle, WA (US); Ken Thai, Los Altos, CA (US); Yue Bu, Oakland, CA (US); Tyler Doss, San Francisco, CA (US)

(73) Assignee: Stripe, LLC, South San Francisco, CA (US)

( * ) Notice: Subject to any disclaimer, the term of this patent is extended or adjusted under 35 U.S.C. 154(b) by 329 days.

(21) Appl. No.: 18/208,855

(22) Filed: Jun. 12, 2023

(65) Prior Publication Data

US 2024/0414141 A1     Dec. 12, 2024

(51) Int. Cl.
*H04L 9/40* (2022.01)

(52) U.S. Cl.
CPC .................................... *H04L 63/08* (2013.01)

(58) Field of Classification Search
CPC ...................................................... H04L 63/08
See application file for complete search history.

(56) References Cited

U.S. PATENT DOCUMENTS

2018/0357728 A1* 12/2018 Huening ............... H04L 67/535
2022/0358498 A1* 11/2022 Mullins ............... G06Q 20/401

* cited by examiner

*Primary Examiner* — Benjamin A Kaplan
(74) *Attorney, Agent, or Firm* — BAKERHOSTETLER

(57) ABSTRACT

Aspects of the subject technology include determining an association between a first and second user account that comprises a first condition corresponding to a first action to be performed in association with the first user account and a second condition corresponding to a second action to be performed in association with the second user account. Aspects also include generating a first entry based on the association, receiving a first indication indicating completion the first and/or second actions, generating a second entry based on the first indication, wherein the second entry corresponds to the first and/or second conditions, determining whether the first and second condition of the first entry are satisfied based in part on entries in the data structure that correspond to the first and/or second conditions, and transmitting a second indication that the first entry is complete, in response to determining that the first and second condition are satisfied.

20 Claims, 6 Drawing Sheets

INFORMATION
MANAGEMENT
SERVER

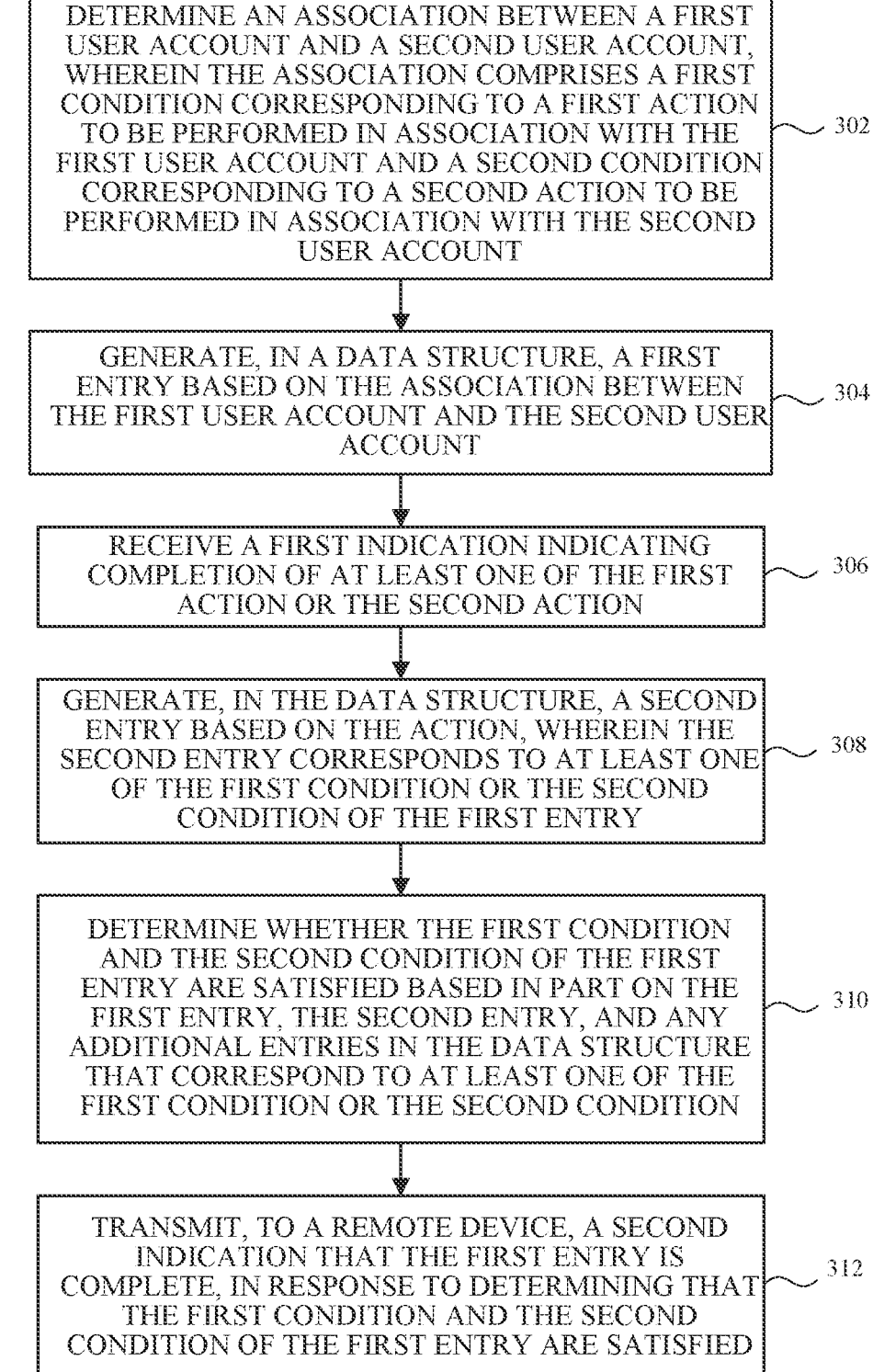

300

DETERMINE AN ASSOCIATION BETWEEN A FIRST USER ACCOUNT AND A SECOND USER ACCOUNT, WHEREIN THE ASSOCIATION COMPRISES A FIRST CONDITION CORRESPONDING TO A FIRST ACTION TO BE PERFORMED IN ASSOCIATION WITH THE FIRST USER ACCOUNT AND A SECOND CONDITION CORRESPONDING TO A SECOND ACTION TO BE PERFORMED IN ASSOCIATION WITH THE SECOND USER ACCOUNT — 302

GENERATE, IN A DATA STRUCTURE, A FIRST ENTRY BASED ON THE ASSOCIATION BETWEEN THE FIRST USER ACCOUNT AND THE SECOND USER ACCOUNT — 304

RECEIVE A FIRST INDICATION INDICATING COMPLETION OF AT LEAST ONE OF THE FIRST ACTION OR THE SECOND ACTION — 306

GENERATE, IN THE DATA STRUCTURE, A SECOND ENTRY BASED ON THE ACTION, WHEREIN THE SECOND ENTRY CORRESPONDS TO AT LEAST ONE OF THE FIRST CONDITION OR THE SECOND CONDITION OF THE FIRST ENTRY — 308

DETERMINE WHETHER THE FIRST CONDITION AND THE SECOND CONDITION OF THE FIRST ENTRY ARE SATISFIED BASED IN PART ON THE FIRST ENTRY, THE SECOND ENTRY, AND ANY ADDITIONAL ENTRIES IN THE DATA STRUCTURE THAT CORRESPOND TO AT LEAST ONE OF THE FIRST CONDITION OR THE SECOND CONDITION — 310

TRANSMIT, TO A REMOTE DEVICE, A SECOND INDICATION THAT THE FIRST ENTRY IS COMPLETE, IN RESPONSE TO DETERMINING THAT THE FIRST CONDITION AND THE SECOND CONDITION OF THE FIRST ENTRY ARE SATISFIED — 312

FIG. 3

UNIFIED MULTI-ACCOUNT BASED INFORMATION MANAGEMENT

TECHNICAL FIELD

The present description generally relates to information management and, more particularly, to unified information management across multiple accounts.

BACKGROUND

Parties may engage in agreements with each other. In some instances, parties may have different workflows and modes of fulfilling conditions from an agreement that may not inter-operate well together.

BRIEF DESCRIPTION OF THE DRAWINGS

Certain features of the subject technology are set forth in the appended claims. However, for the purpose of explanation, several implementations of the subject technology are set forth in the following figures.

FIG. 3 depicts a flow diagram of an example process for unified multi-account based information management, in accordance with one or more implementations.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Businesses may handle their obligations and agreements through various separate systems, such as contract management systems, accounting systems, and inventory management systems. This may result in a lack of coordination and visibility across different aspects of the business, as well as a higher risk of errors and inconsistencies.

Aspects of the subject technology provide a unified system that can track aspects of associations (e.g., agreements) between two or more parties (e.g., user accounts), including conditions (e.g., material obligations or financial obligations), through a single source of truth. This may reduce overhead and complexity, eliminate data duplication and inconsistencies, and provide businesses with a more accurate and complete view of their financial and inventory data. Additionally, by treating products as interchangeable, like currency, the subject technology can enable businesses to manage their inventory alongside their associations and corresponding conditions. This can provide users and/or businesses with greater visibility and control over their operations, which can help them optimize their processes and make more informed decisions.

Figure 1:
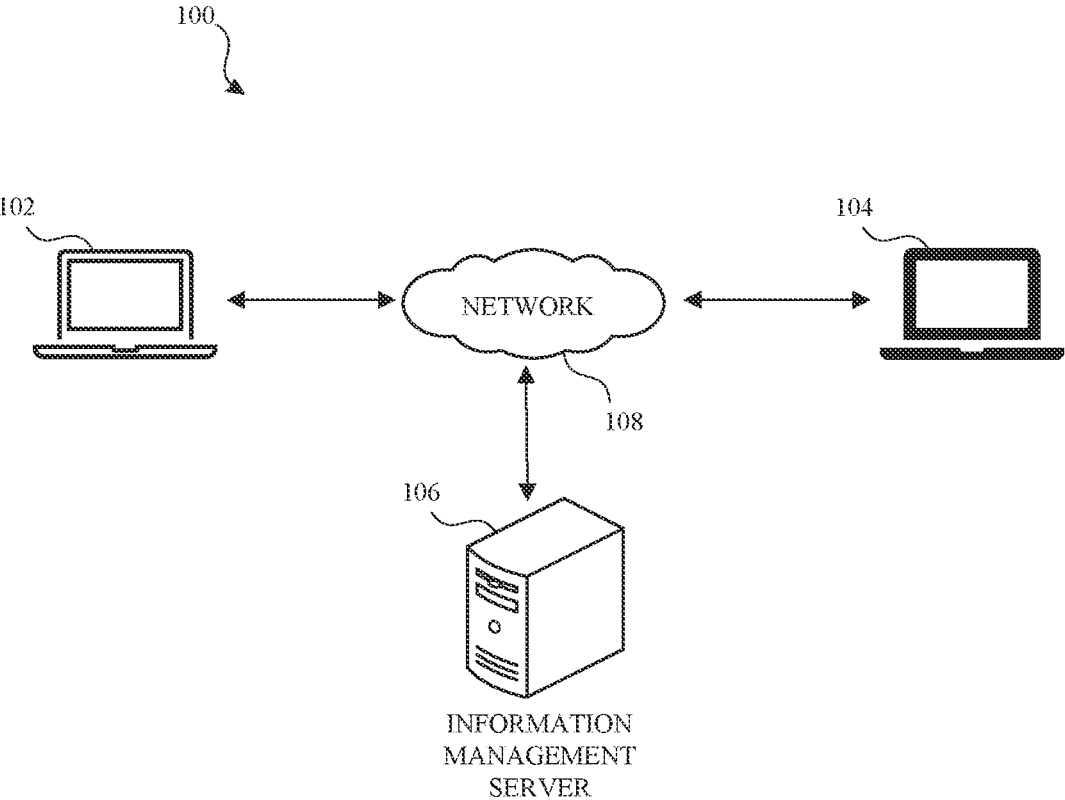
FIG. 1 illustrates an example network environment in which a unified multi-account based information management system may be implemented in accordance with one or more implementations.

FIG. 1 illustrates an example network environment 100 in which a unified multi-account based information management system may be implemented in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 may include a first user device 102, a second user device 104, and an information management server 106. The network 108 may communicatively (directly or indirectly) couple one or more of the first user device 102, second user device 104, and/or information management server 106. In one or more implementations, the network 108 may be an interconnected network of devices that may include, or may be communicatively coupled to, the Internet.

For explanatory purposes, the network environment 100 is illustrated in FIG. 1 as including the first user device 102, the second user device 104, and information management server 106; however, the network environment 100 may include any number of electronic devices and/or any number of servers communicatively coupled to each other directly or via the network 108. In addition, the various systems of FIG. 1 may be, and/or may include all or part of, the electronic system discussed below with respect to FIG. 6.

The first user device 102 may be, for example, a wearable device such as a watch, a band, and the like, a desktop computer, a portable computing device such as a laptop computer, a smartphone, a peripheral device (e.g., a digital camera, headphones), a tablet device, or any other appropriate device that includes, for example, one or more wireless interfaces, such as WLAN radios, cellular radios, Bluetooth radios, Zigbee radios, near field communication (NFC) radios, and/or other wireless radios. In FIG. 1, by way of example, the first user device 102 is depicted as a laptop computer. The first user device 102 may be associated with one or more accounts (e.g., a first user account), credentials, or any other identity information registered with the information management server 106 belonging to a first user associated with the first user device 102.

The second user device 104 may be a device similar to the device described with respect to the first user device 102, although the second user device 104 and the first user device 102 do not necessarily need to be the same type of device. In FIG. 1, by way of example, the second user device 104 is depicted as a laptop computer. The second user device 104 may be associated with one or more accounts (e.g., a second user account), credentials, or any other identity information registered with the information management server 106 belonging to a second user associated with the second user device 104.

The information management server 106 may be and/or may include, for example, one or more servers that host or facilitate a service that may be used by one or more parties (e.g., the first user device 102 and the second user device 104). The information management server 106 may determine associations between parties and their respective conditions. Parties may view, create, satisfy, or otherwise modify their conditions in a format suitable for them (e.g., via custom plugins), which may be stored in a standardized manner on the information management server 106 so that conditions and their modifications may be understandable between parties regardless of the format in which they take place.

The information management server 106 may store account information (e.g., user account, usernames/handles, or any other account-specific data) associated with the first user device 102 and/or second user device 104 and/or users thereof and/or users associated therewith. The information management server 106 may be, and/or may include all or part of, the electronic system discussed below with respect to FIG. 6.

Figure 2:
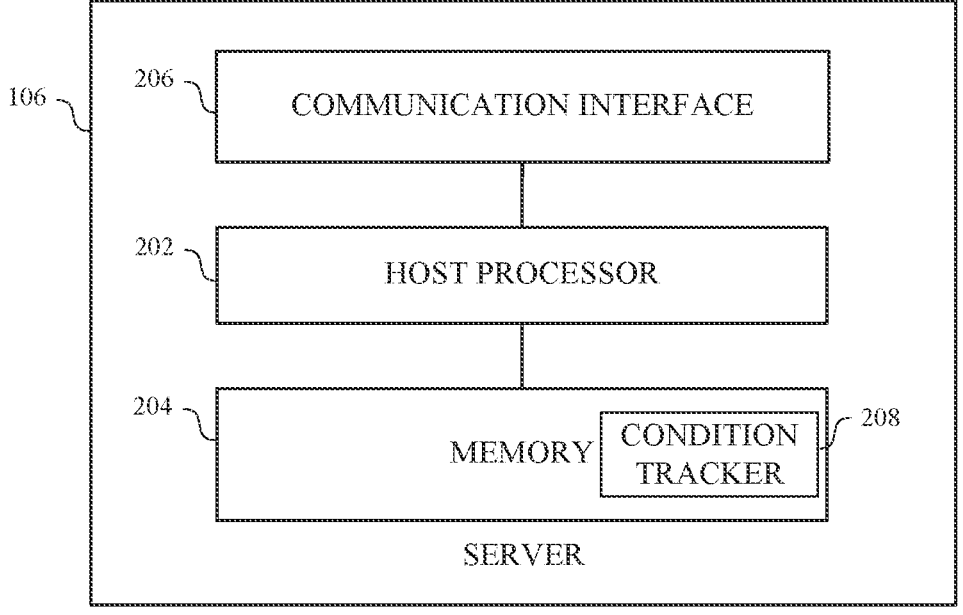
FIG. 2 depicts an example server that may be used in a unified multi-account based information management system in accordance with one or more implementations.

FIG. 2 depicts an example information management server 106 that may be used in a unified multi-account based information management system in accordance with one or more implementations. For explanatory purposes, FIG. 2 is primarily described herein with reference to the information management server 106 of FIG. 1. However, this is merely illustrative, and features of the electronic device of FIG. 2 may be implemented in any other electronic device for implementing the subject technology. Not all of the depicted components may be used in all implementations, however, and one or more implementations may include additional or different components than those shown in FIG. 2. Variations in the arrangement and type of the components may be made without departing from the spirit or scope of the claims as set forth herein. Additional components, different components, or fewer components may be provided.

The information management server 106 may include one or more of a host processor 202, a memory 204, and/or a communication interface 206. The host processor 202 may include suitable logic, circuitry, and/or code that enable processing data and/or controlling operations of the information management server 106. In this regard, the host processor 202 may be enabled to provide control signals to various other components of the information management server 106. The host processor 202 may also control transfers of data between various portions of the information management server 106. The host processor 202 may further implement an operating system or may otherwise execute code to manage operations of the information management server 106.

The memory 204 may include suitable logic, circuitry, and/or code that enable storage of various types of information such as received data, generated data, code, and/or configuration information. The memory 204 may include volatile memory (e.g., random access memory (RAM)) and/or non-volatile memory (e.g., read-only memory (ROM), flash, and/or magnetic storage). In one or more implementations, the memory 204 may store user location data, track data (e.g., lane information), exercise data (e.g., biometrics), account data, and any other data generated in the course of performing the processes described herein.

The condition tracker 208 may be a computer process configured to obtain and/or store information about conditions of association(s) between parties, such as the due date, the amount owed, and the products or services to be delivered. The condition tracker 208 may store the information in a centralized database, which may be local to (e.g., in memory 204) or remote from the information management server 106. The database may be structured to use double-entry accounting principles to ensure that all conditions and corresponding balances are properly tracked and recorded. Accordingly, each entry in the ledger may have corresponding entries (e.g., a debit and a credit entry), ensuring that the conditions between parties stay in balance. In order to access the information in the condition tracker 208, parties may use an application programming interface (API) or a web-based interface. The API could be used to integrate the condition tracker 208 with other business systems, such as accounting or inventory management software, allowing for real-time updates to the conditions and balances recorded in the ledger. To further help with integration, the condition tracker 208 may store information in a standardized format that may be translated and usable by other business systems, such as plugins and remote systems.

The communication interface 206 may include suitable logic, circuitry, and/or code that enables wired or wireless communication, such as between the first user device 102, second user device 104, and information management server 106. The communication interface 206 may include, for example, one or more of a Bluetooth communication interface, an NFC interface, a Zigbee communication interface, a WLAN communication interface, a USB communication interface, a cellular interface, or generally any communication interface.

In one or more implementations, one or more of the host processor 202, the memory 204, the communication interface 206, and/or one or more portions thereof may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

FIG. 3 depicts a flow diagram of an example process 300 for unified multi-account based information management, in accordance with one or more implementations. For explanatory purposes, the process 300 is primarily described herein with reference to the first user device 102, the second user device 104, and the information management server 106 of FIG. 1. However, the process 300 is not limited to the first user device 102, the second user device 104, and the information management server 106, and one or more blocks of the process 300 may be performed by one or more other by other suitable devices. Further, for explanatory purposes, the blocks of the process 300 are described herein as occurring sequentially or linearly. However, multiple blocks of the process 300 may occur in parallel. In addition, the blocks of the process 300 need not be performed in the order shown and/or one or more blocks of the process 300 need not be performed and/or can be replaced by other operations.

At block 302, the information management server 106 may determine an association between a first user account and a second user account. The first user account may be a user account associated with the first user device 102, and the second user account may be a user account associated with the second user device 104. The user accounts of the first user device 102 and the second user device 104 may be accounts registered with the information management server 106 so that the first user device 102 and the second user device 104 may interact with the information management server 106.

The association may be derived from an agreement established between a first user account and a second user account. The association may represent the relationship between the first user account and the second user account, including any duties, actions, obligations, or any other conditions to satisfy the agreement. For example, the association may include a first condition corresponding to the first user account and a second condition corresponding to the second user account. It should be understood that associations are not limited to two parties and that a two-party association is described with respect to the process 300 as an example.

In some implementations, this block 302 may be triggered by a request to establish an association. For example, the information management server 106 may receive a request from the first user device 102 and/or the second user device 104 to establish an association with the second user device 104 and/or the first user device 102, respectively. The request may include the agreement, the relevant parties (e.g., the first user device 102 and/or the second user device 104), and any other information relevant to the association.

At block 304, the information management server 106 may generate a first entry for storage in a data structure based on the association between the first user device 102 and the second user device 104. The association may be represented by one or more entries on a data structure (e.g., a double-entry ledger). The data structure may be centralized to allow for a single source of truth that may be referenced across multiple systems belonging to multiple users. The entries in the data structure may be standardized to allow for any kind of information to be utilized. For example, the information may be monetary and product conditions, which can then be used to track not only the financials but also the inventory of the second user device 104.

The standardized nature of the information in the entries enables users to create custom entries (e.g., conditions of $1, a shirt, or a month of service), as far as their products are concerned, and report whether the entries have been satisfied. To do so, the information in an entry can be adjusted toward or away from satisfaction by another entry. Much like how a monetary balance can be adjusted by credit and debit entries, an entry including one shirt, for example, can be reduced to zero shirts, satisfying the agreement, based on another entry including one shipment, which may include the one shirt.

The information management server 106 may convert the association and/or its conditions into a standardized format and then generate an entry based on the association and/or its conditions in the standardized format (e.g., predefined models, schemas, and/or the like, that are digitally encoded in a predefined format such as XML, JSON, YAML, and/or the like). The information management server 106 may include one or more adapters for users to input information in a format that is particular to the user (e.g., non-standardized) which converts the input information into a standardized format for their information management server 106.

In some implementations, the information management server 106 may generate multiple separate entries based on the association between the first user device 102 and the second user device 104. For example, when the first user device 102 purchases five items from the second device 104, the information management server 106 generates one entry indicating that five items were purchased, one entry indicating that three items were purchased and one entry indicating that two items were purchased, and/or five entries each indicating that one item was purchased.

At block 306, the information management server 106 may receive an indication of an action performed with regard to the association. An action may be any event or activity related to the fulfillment or modification of any part of the association (e.g., a condition). For example, an action could be provisioning access to a product or receiving a payment for an outstanding balance. When the information management server 106 receives an indication of an action performed with regard to the association, the information management server 106 is informed of the activity that has taken place. This could be through an automated notification, a manual input by a user, or a data feed from a third-party service. The indication may be a signal, message, or any other form of notification. The indication may be received from the device that performed the action or any other device related to the action.

In some implementations, after receiving the indication of an action performed with regard to an association, the information management server 106 may verify that the action has indeed been performed. For instance, the user accounts associated with the association may each have a respective public/private keypair. The indication that the action has been performed may be signed by the private key of one or more of the user accounts. The information management server 106 may then use the corresponding public keys to verify that one user account has indeed indicated that the action was performed or that the user accounts agree that the action was performed. Such a verification process may help the information management system maintain accurate records of the status of the association and its related activities. By verifying that the action has been performed, the system can provide users with up to date information regarding the status of their associations and can also facilitate automated processes related to the association, such as triggering payments or other actions based on the completion of specific actions.

In some implementations, entries may be automatically generated by calls from one or more external systems of the first user device 102 and/or the second user device 104. For example, a fulfillment entry of a shirt from the second user device 104 may be generated in response to shipping labels passing through a shipping system and indicating a delivery of the shirt.

At block 308, the information management server 106 may generate, in the data structure, a second entry based on the action. The second entry can include various information, such as the date and time of the action, the nature of the action, and any other relevant details. The second entry may correspond to at least one of the first and/or second conditions of the first entry. For example, if the association between the first user device 102 and the second user device 104 involves a product condition, the first entry in the data structure may specify the product that is owed, and the second entry may indicate that the product has been shipped by the second user device 104. In this case, the second entry corresponds to the second condition of the first entry (e.g., that the product be delivered), and its inclusion in the data structure allows the information management server 106 to determine whether both conditions of the first entry have been satisfied.

Similarly, for example, the second entry may be a first action performed by the first user device 102 to the second user device 104, in the case of a monetary condition. The first entry in this case might specify the amount owed, and the second entry might specify that the payment has been received. In this case, the second entry corresponds to the first condition of the first entry (e.g., that the payment be made).

In some implementations, the information management server 106 may receive additional indications corresponding to additional actions performed with regard to the association. The information management server 106 may generate additional entries based on the additional actions. The additional entries may correspond to one or more of the conditions of the first entry. For example, if the association between the first user account and the second user account involves a product condition, the first entry in the data structure may specify multiple products that are owed, the second entry may indicate that one type of product has been shipped by the second user account, and a third entry may indicate that another type of product has been separately shipped by the second user account.

In some implementations, associations may be between more than two user accounts. Accordingly, the information management server 106 may also generate additional entries based on actions from additional parties. For example, if the association between the first user account and the second user account also includes a third user account, the first entry in the data structure may specify that multiple products are owed to multiple user accounts, the second entry may indicate that one type of product has been provisioned by the second user account to the first user account, and the third entry may indicate that another type of product has been shipped by the second user account to the third user account.

In some implementations, the information management server 106 may generate multiple separate entries based on the action. For example, when the second user device 104 delivers five items to the first user device 102, the information management server 106 generates one entry indicating that five items were delivered, one entry indicating that three items were delivered and one entry indicating that two items were delivered, and/or five entries each indicating that one item was delivered.

At block 310, the information management server 106 may determine whether the first condition and the second condition of the first entry are satisfied. This determination may be based at least in part on one or more entries (e.g., the first entry and/or the second entry) in the data structure that corresponds to the first condition or the second condition. When the information management server 106 determines whether the first and second conditions of the first entry are satisfied, it examines the data structure to determine if there are any entries that correspond to the first and second conditions. If there are, it analyzes those entries and the information they contain to determine if the conditions have been met.

For example, assume the first entry in the data structure corresponds to a monetary condition between the first user device 102 and the second user device 104. The first condition states that the first user device 102 owes the second user device 104 $100, and the second condition states that the second user device 104 must receive the $100 by a certain date. The information management server 106 then receives a second entry indicating that the first user device 102 has sent $50 to the second user device 104. Based on the second entry, the information management server 106 may negate (e.g., subtract) that amount from the amount owed by the first user device 102 to the second user device 104 ($100–$50=$50). If the amount owed is fully negated, then the first condition may be satisfied.

Block 310, in which the information management server 106 determines whether the first and second conditions of the first entry are satisfied, may be triggered each time an action is received and/or processed for a given association. This helps the system continuously monitor the status of the association and its related conditions, allowing it to take prompt action in response to any changes. Additionally or alternatively, block 310 may be performed periodically, such as at regular intervals (e.g., daily, weekly, or monthly). This periodic review helps capture and process changes to the status of the association in a timely manner and helps the system remains up to date with the latest information regarding the association and its related conditions.

In some implementations, the information management server 106 may also check the deadline to ensure that the action was performed by the required date of the condition. If the action was not performed in time, the information management server 106 may generate a new entry having a new condition for the first user account to satisfy (e.g., late fees) as specified by the association between the first user account and the second user account. If the breach is severe, such as a failure to fulfill a major condition of the agreement, the information management server 106 may take more drastic action. For example, the system may generate a new association (e.g., agreement) that includes a condition indicating that the party who breached the agreement must return the product that was not paid for or pay a penalty, for example. This new association may also include additional conditions that provide additional protections to the non-breaching party, such as requiring payment upfront for future transactions.

In some implementations, a combination of multiple entries (e.g., a second and third entry) may satisfy one or more of the conditions. For example, another action for the first user device 102 to send $50 may cause the generation of a third entry. The information management server 106 may negate (e.g., subtract) that amount from the amount owed by the first user device 102 to the second user device 104 in addition to the amount from the second entry ($100–$50–$50=$0). If the amount is fully negated, then the first condition may be satisfied.

At bock 312, if the conditions are satisfied, the information management server 106 may generate an indication that the first entry is complete. If there are no further conditions (e.g., conditions established by other entries), then the agreement (e.g., the association) may be fully satisfied as well. The indication may include information about the agreement, such as the parties involved, the conditions each party had, and the date on which the agreement was fulfilled.

The indication may be stored in the data structure and may be provided to one or more parties involved in the agreement, as well as any other stakeholders who may need to be informed, such as legal or financial teams. The recipient(s) of the indication may use it as proof that the agreement has been fulfilled. For example, if the agreement were a contract between a company and a vendor for the purchase of a product, the indication of completion could be sent to both parties and used as proof that the vendor delivered the product and the company paid for it, meeting the terms of the contract. The indication could also be used by the company's accounting team to reconcile the payment with the vendor's invoice and update financial records.

In some implementations, the indication may be signed by the private key of the information management server 106 to provide an additional layer of security and authentication. This would allow other entities, such as auditors or regulators, to verify that the agreement was fulfilled by using the corresponding public key. By providing this cryptographic proof, the information management server 106 can demonstrate that the indication of completion is trustworthy and can be relied upon by all parties involved in the agreement.

For example, once the conditions of the first entry, such as the payment and delivery, have been met, the information management server 106 may generate an indication that the first entry is complete. This indication could be in the form of a digital message, such as a digital certificate, an email, or the like, that includes the relevant information about the agreement, such as the parties involved, the conditions each party had, and the date on which the agreement was fulfilled. To provide an additional layer of security and authentication, the information management server 106 may sign this message with its private key. This process may involve generating a unique digital signature for the message using a cryptographic algorithm. The private key may be used to create the signature, and the corresponding public key may be used to verify the signature's authenticity. The signature can provide proof that the message came from the information management server 106 and has not been altered since it was signed. This is because the signature is created using both the message and the private key, and any alteration of the message will result in a different signature. The public key can then be used by any party to verify the signature and ensure that the message is authentic and has not been tampered with.

Figure 4:
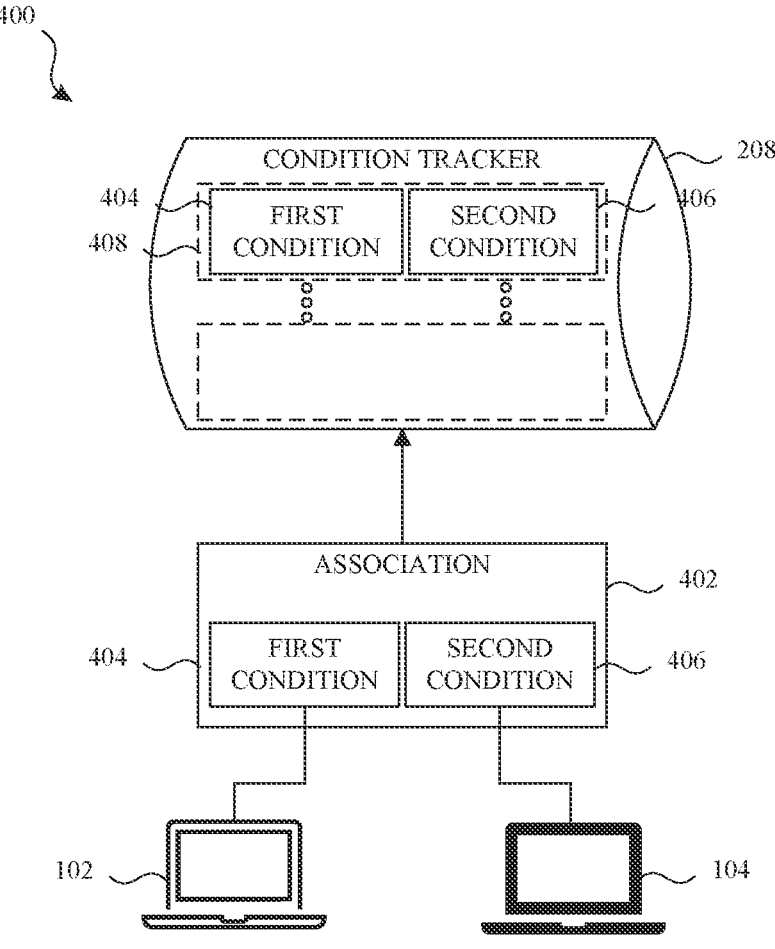
FIG. 4 depicts a diagram of an example association between a first user and a second user, in accordance with one or more implementations.

FIG. 4 depicts a diagram 400 of an example association 402 between the first user device 102 and the second user device 104, in accordance with one or more implementations. In this example, the first user account at the first user device 102 may purchase a software product from the second user account at the second user device 104. The first user account and the second user account may agree on the conditions of the association 402, and then either or both of the first user device 102 and the second user device 104 may send the association 402 to the information management server 106.

The association 402 may be recorded by a condition tracker 208 of the information management server 106 as an association between the two parties (e.g., the first user device 102 and the second user device 104). The information management server 106 may generate and store a first entry 408, which corresponds to the association 402, via the condition tracker 208. The first entry 408 may include the first condition 404 for the first user account and the second condition 406 for the second user account.

In one example use case, the first user account at the first user device 102 is purchasing a single item from the second user account at the second user device 104. The first user account and second user account first agree to the terms of the association 402, which includes the price of the item and the payment deadline. As indicated by the association 402, the first user account would send the payment to the second user account to satisfy its condition, and the second user account would ship the item to the first user account (and/or otherwise provide the item to the first user account) to satisfy its condition. The information management server 106 records the association 402 and stores the first entry 408 via the condition tracker 208 in a standardized format. The information management server 106 can also generate an invoice or receipt for the transaction that is sent to the first user account and/or the second user account.

In another example use case, the first user account is purchasing a monthly subscription to a software product from the second user account. The first user account and second user account first agree to the terms of the association 402 (e.g., the monthly subscription fee and payment deadline) and terms of the second condition 406. The system records the association 402 and stores the first entry via the condition tracker 208, which includes the first condition 404 of the first user account to the second user account and the second condition 406 of the second user account to provide the software product on a monthly basis. The first entry may be stored in a standardized format, which may be a daily amount. The first condition 404 may be stored as a number representing the dollars per day owed, and the second condition 406 may be stored as a number representing the days to provision the software. The information management server 106 can also generate an invoice or receipt for the transaction that is sent to the first user account and the second user account.

Figure 5:
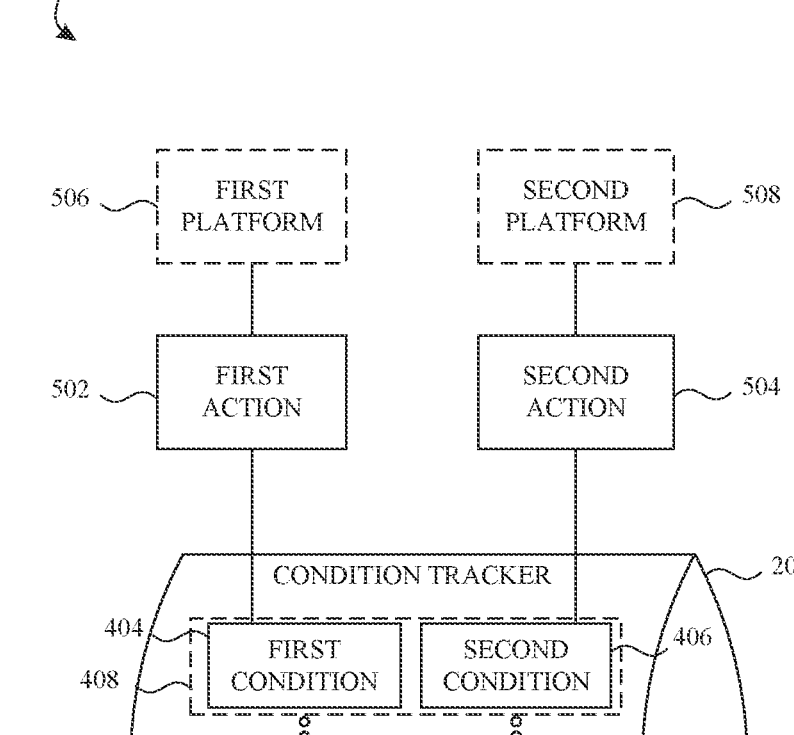
FIG. 5 depicts a diagram of an example conditions of the first user and the second user of FIG. 4, in accordance with one or more implementations.

FIG. 5 depicts a diagram 500 of example conditions of the first user device 102 and the second user device 104 of FIG. 4, in accordance with one or more implementations. The first user account has entered into an association 402 with second user account in which the first user account is obligated to take a first action (e.g., make a payment) corresponding to a second action (e.g., for a product to be provided) by the second user account. To fulfill its condition, the first user account may employ a first platform 506, which may belong to a third party, such as a payment processor. The first user account may initiate a first action 502 through the first platform 506 in order to satisfy its first condition 404. The first platform 506 may verify the transaction, and subsequently, transfer the funds to the account of second user account. The first platform 506 may notify the information management server 106 of the first action 510, and the information management server 106 may generate an entry 514 to store information relating to the first action 510.

On the other end, the second user account may receive an indication of performance of the first action 510 and is obligated to fulfill its part of the association 402 by providing the product to the first user account. To fulfill this condition, the second user account may utilize a second platform 508, which may be part of the second user device 104 or a third-party device, such as a supply chain management platform, and designed to handle the product fulfillment process (e.g., by tracking shipping information). Accordingly, the second user account may initiate a second action 504, which results in the product being shipped to an address associated with the first user account. The second platform 508 may notify the information management server 106 of the second action 504 (e.g., shipment), and the information management server 106 may generate an entry 516 to store information relating to the second action 512 (e.g., the number of items shipped and their tracking number).

The information management server 106 may determine whether the first condition 404 in the first entry 408 is satisfied based on the first entry 408 as well as any other relevant entries in the database of the condition tracker 208, such as the second entry 514 and the third entry 516. If the first condition 404 is satisfied, the information management server 106 may generate an indication that the first condition 404 is complete, which may be provided to the parties of the association 402.

The second user account may fulfill the second condition 406 by providing the product to the first user account. When that occurs, the information management server 106 may receive an indication of the second action 504. The information management server 106 may generate and store a third entry 516 via the condition tracker 208 based on the second action 504, which corresponds to the second condition 406 in the first entry 408.

The information management server 106 may then determine whether the second condition 406 in the first entry 408 is satisfied based on the first entry 408, second entry 514, and third entry 516, as well as any other relevant entries in the database of the condition tracker 208. If the second condition 406 is satisfied (e.g., by determining that the quantity of product owed is negated by the quantity of product provided), the information management server 106 may generate an indication that the second condition 406 is complete.

Both the first user account and the second user account can access/receive the indications of the completed conditions through the information management server 106. The first user account can use the indication of the first condition 404 being complete as proof of payment, and the second user account can use the indication of the second condition 406 being complete as proof of product delivery. The first user account and/or the second user account may request one or more entries from the database of the condition tracker 208 and the request may provide an indication of the format for the data. The information management server 106 may access the entries relevant to the request, convert the information as indicated in the request, and provide the information to the requester. For example, the database of the condition tracker 208 may store the amount of software to provision in days but the second user device 104 may wish to receive the data in terms of months; the information management server 106 may convert the information in one or more entries from days to months and provide the information to the second user device 104.

Figure 6:
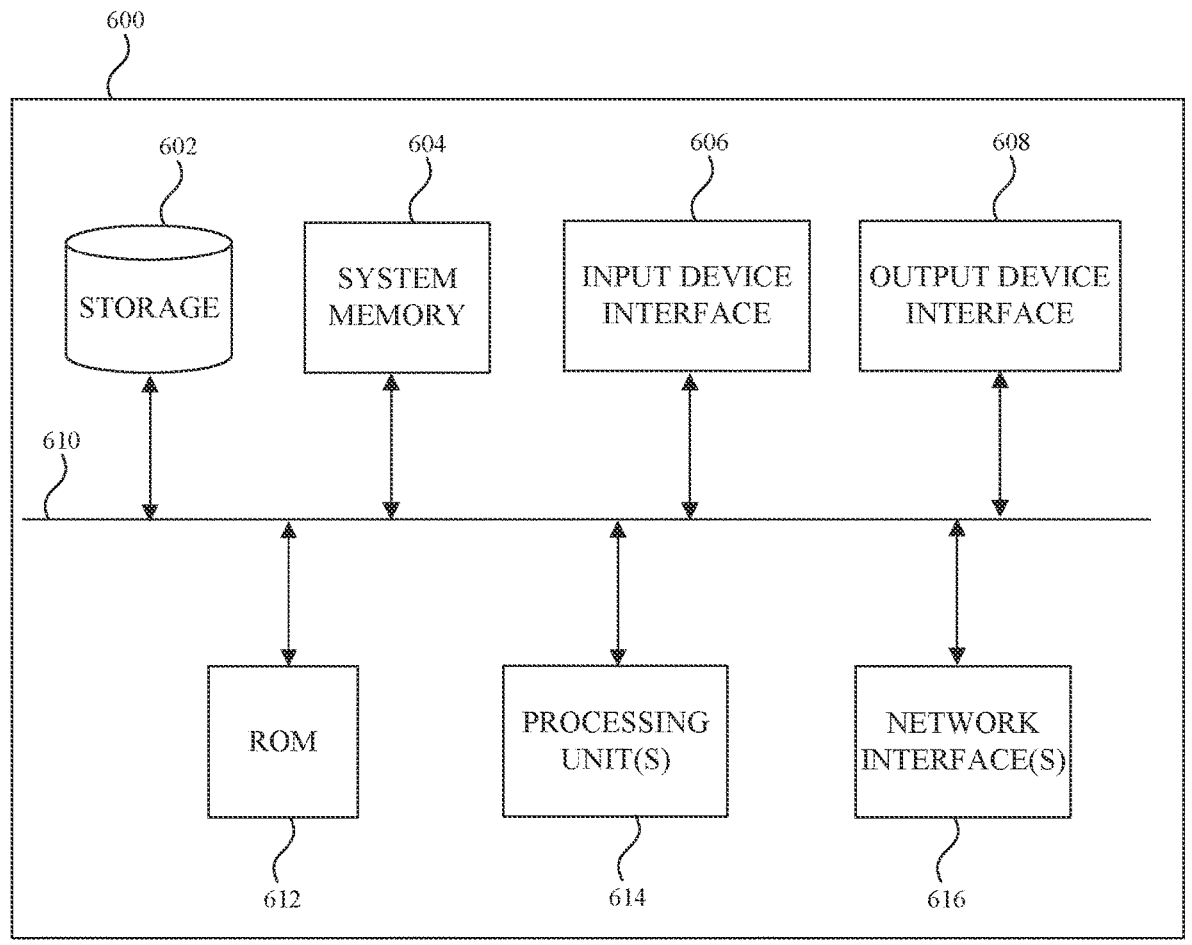
FIG. 6 depicts an example electronic system with which aspects of the present disclosure may be implemented, in accordance with one or more implementations.

FIG. 6 depicts an example electronic system 600 with which aspects of the present disclosure may be implemented, in accordance with one or more implementations. The electronic system 600 can be, and/or can be a part of, any electronic device for generating the features and processes described in reference to FIGS. 1-5, including but not limited to a laptop computer, tablet computer, smartphone, and wearable device (e.g., smartwatch, fitness band). The electronic system 600 may include various types of computer-readable media and interfaces for various other types of computer-readable media. The electronic system 600 includes one or more processing unit(s) 614, a persistent storage device 602, a system memory 604 (and/or buffer), an input device interface 606, an output device interface 608, a bus 610, a ROM 612, one or more processing unit(s) 614, one or more network interface(s) 616, and/or subsets and variations thereof.

The bus 610 collectively represents all system, peripheral, and chipset buses that communicatively connect the numerous internal devices of the electronic system 600. In one or more implementations, the bus 610 communicatively connects the one or more processing unit(s) 614 with the ROM 612, the system memory 604, and the persistent storage device 602. From these various memory units, the one or more processing unit(s) 614 retrieves instructions to execute and data to process in order to execute the processes of the subject disclosure. The one or more processing unit(s) 614 can be a single processor or a multi-core processor in different implementations.

The ROM 612 stores static data and instructions that are needed by the one or more processing unit(s) 614 and other modules of the electronic system 600. The persistent storage device 602, on the other hand, may be a read-and-write memory device. The persistent storage device 602 may be a non-volatile memory unit that stores instructions and data even when the electronic system 600 is off. In one or more implementations, a mass-storage device (such as a magnetic or optical disk and its corresponding disk drive) may be used as the persistent storage device 602.

In one or more implementations, a removable storage device (such as a floppy disk, flash drive, and its corresponding disk drive) may be used as the persistent storage device 602. Like the persistent storage device 602, the system memory 604 may be a read-and-write memory device. However, unlike the persistent storage device 602, the system memory 604 may be a volatile read-and-write memory, such as RAM. The system memory 604 may store any of the instructions and data that one or more processing unit(s) 614 may need at runtime. In one or more implementations, the processes of the subject disclosure are stored in the system memory 604, the persistent storage device 602, and/or the ROM 612. From these various memory units, the one or more processing unit(s) 614 retrieves instructions to execute and data to process in order to execute the processes of one or more implementations.

The bus 610 also connects to the input device interfaces 606 and output device interfaces 608. The input device interface 606 enables a user to communicate information and select commands to the electronic system 600. Input devices that may be used with the input device interface 606 may include, for example, alphanumeric keyboards, touch screens, and pointing devices. The output device interface 608 may enable the electronic system 600 to communicate information to users. For example, the output device interface 608 may provide the display of images generated by electronic system 600. Output devices that may be used with the output device interface 608 may include, for example, printers and display devices, such as a liquid crystal display (LCD), a light emitting diode (LED) display, an organic light emitting diode (OLED) display, a flexible display, a flat panel display, a solid-state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

The bus 610 also couples the electronic system 600 to one or more networks and/or to one or more network nodes through the one or more network interface(s) 616. In this manner, the electronic system 600 can be a part of a network of computers (such as a local area network, a wide area network, an Intranet, or a network of networks, such as the Internet). Any or all components of the electronic system 600 can be used in conjunction with the subject disclosure.

Implementations within the scope of the present disclosure can be partially or entirely realized using a tangible computer-readable storage medium (or multiple tangible computer-readable storage media of one or more types) encoding one or more computer-readable instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, race-track memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessors or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way), all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together into a single software product or packaged into multiple software products.

As used in this specification and any claims of this application, the terms "base station," "receiver," "computer," "server," "processor," and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refers to only A, only B, or only C; any combination of A, B, and C; and/or at least one of each of A, B, and C.

The predicate words "configured to," "operable to," and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, one or more implementations, an embodiment, the embodiment, another embodiment, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any implementation described herein as "exemplary" or as an "example" is not necessarily to be construed as preferred or advantageous over other implementations. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method comprising:
determining an association between a first user account and a second user account, wherein the association comprises a first condition corresponding to a first action to be performed in association with the first user account and a second condition corresponding to a second action to be performed in association with the second user account;
generating, in a data structure, a first entry based on the association between the first user account and the second user account, the first entry including both the first condition and the second condition;
receiving a first indication indicating completion of the first action;
generating, in the data structure, a second entry based on the first indication, wherein the second entry corresponds to at least one of the first condition or the second condition of the first entry;
receiving a second indication indicating a partial completion of the second action;
generating, in the data structure, a third entry based on the second indication, wherein the third entry includes a third condition corresponding to a remaining portion associated with the partial completion of the second action;
determining whether the first condition and the second condition of the first entry are satisfied based in part on the first entry, the second entry, the third entry, and any additional entries in the data structure that correspond to at least one of the first condition or the second condition; and
transmitting, to a remote device, a third indication that the first entry is complete, in response to determining that the first condition and the second condition of the first entry are satisfied.

2. The method of claim 1, further comprising:
receiving, from a first electronic device associated with the first user account, a request to establish the association.

3. The method of claim 2, further comprising:
providing the third indication to at least one of the first electronic device associated with the first user account or a second electronic device associated with the second user account.

4. The method of claim 1, further comprising:
determining whether the second entry and the third entry satisfy at least one of the first condition or the second condition; and outputting a fourth indication that at least one of the first condition or the second condition is satisfied, in response to determining that the second entry and the third entry satisfy at least one of the first condition or the second condition.

5. The method of claim 1, further comprising:
storing the third indication in the data structure, in response to generating the third indication.

6. The method of claim 1, wherein generating the first entry based on the first condition and the second condition comprises:
converting the first condition and the second condition into a standardized format; and
generating the first entry based on the first condition and the second condition in the standardized format.

7. The method of claim 1, further comprising:
receiving a request for one or more entries, wherein the request comprises an indication of a non-standardized format;
obtaining, in response to the request, the one or more entries from the data structure, wherein the one or more entries are in a standardized format;
converting the one or more entries into the non-standardized format; and
outputting the one or more entries, wherein the one or more entries are in the non-standardized format.

8. The method of claim 1, further comprising:
prior to transmitting the third indication, encrypting the third indication with a private key to verify authenticity of the third indication, wherein the remote device decrypts the third indication with a corresponding public key to verify authenticity of the third indication.

9. The method of claim 1, further comprising:
generating a fourth entry as a double-entry of the first entry including a fourth condition corresponding to the first condition and a fifth condition corresponding to the second condition, wherein the fourth condition relates to the first action to be performed by the first user account from a perspective of the second user account, and wherein the fifth condition relates to the second action to be performed by the second user account from a perspective of the first user account.

10. The method of claim 1, wherein the data structure corresponds to a centralized data structure controlled by a single entity.

11. A system comprising:
a memory; and
a processor configured to:
determine an association between a first user account and a second user account, wherein the association comprises a first condition corresponding to a first action to be performed in association with the first user account and a second condition corresponding to a second action to be performed in association with the second user account;
generate, in a data structure, a first entry based on the association between the first user account and the second user account, the first entry including both the first condition and the second condition;
receive a first indication indicating completion of the first action;
generate, in the data structure, a second entry based on the first indication, wherein the second entry corresponds to at least one of the first condition or the second condition of the first entry;
receive a second indication indicating a partial completion of the second action;

generate, in the data structure, a third entry based on the second indication, wherein the third entry includes a third condition corresponding to a remaining portion associated with the partial completion of the second action;

determine whether the first condition and the second condition of the first entry are satisfied based in part on the first entry, the second entry, the third entry, and any additional entries in the data structure that correspond to at least one of the first condition or the second condition; and transmit, to a remote device, a third indication that the first entry is complete, in response to determining that the first condition and the second condition of the first entry are satisfied.

12. The system of claim 11, wherein the processor is further configured to:

receive, from a first electronic device associated with the first user account, a request to establish the association.

13. The system of claim 12, wherein the processor is further configured to:

provide the third indication to at least one of the first electronic device associated with the first user account or a second electronic device associated with the second user account.

14. The system of claim 11, wherein the processor is further configured to:

determine whether the second entry and the third entry satisfy at least one of the first condition or the second condition; and output a fourth indication that at least one of the first condition or the second condition is satisfied, in response to determining that the second entry and the third entry satisfy at least one of the first condition or the second condition.

15. The system of claim 11, wherein the processor is further configured to:

store the third indication in the data structure, in response to generating the third indication.

16. The system of claim 11, wherein generating the first entry based on the first condition and the second condition comprises:

converting the first condition and the second condition into a standardized format; and generating the first entry based on the first condition and the second condition in the standardized format.

17. The system of claim 11, wherein the processor is further configured to:

receive a request for one or more entries, wherein the request comprises an indication of a non-standardized format;

obtain, in response to the request, the one or more entries from the data structure, wherein the one or more entries are in a standardized format;

convert the one or more entries into the non-standardized format; and output the one or more entries, wherein the one or more entries are in the non-standardized format.

18. A non-transitory computer-readable medium comprising:

computer-readable instructions that, when executed by a processor, cause the processor to perform one or more operations comprising:

determining an association between a first user account and a second user account, wherein the association comprises a first condition corresponding to a first action to be performed in association with the first user account and a second condition corresponding to a second action to be performed in association with the second user account;

generating, in a data structure, a first entry based on the association between the first user account and the second user account, the first entry including both the first condition and the second condition;

receiving a first indication indicating completion of the first action;

generating, in the data structure, a second entry based on the first indication, wherein the second entry corresponds to at least one of the first condition or the second condition of the first entry;

receiving a second indication indicating a partial completion of the second action;

generating, in the data structure, a third entry based on the second indication, wherein the third entry includes a third condition corresponding to a remaining portion associated with the partial completion of the second action;

determining whether the first condition and the second condition of the first entry are satisfied based in part on the first entry, the second entry, the third entry, and any additional entries in the data structure that correspond to at least one of the first condition or the second condition; and transmitting, to a remote device, a third indication that the first entry is complete, in response to determining that the first condition and the second condition of the first entry are satisfied.

19. The non-transitory computer-readable medium of claim 18, further comprising:

receiving, from a first electronic device associated with the first user account, a request to establish the association.

20. The non-transitory computer-readable medium of claim 19, further comprising:

providing the third indication to at least one of the first electronic device associated with the first user account or a second electronic device associated with the second user account.

\* \* \* \* \*